(12) United States Patent
Wu et al.

(10) Patent No.: US 9,834,698 B2
(45) Date of Patent: Dec. 5, 2017

(54) LATEX BINDERS USEFUL IN ZERO OR LOW VOC COATING COMPOSITIONS

(71) Applicant: Arkema Inc., King of Prussia, PA (US)

(72) Inventors: Wenjun Wu, Cary, NC (US); Michael C. Kaufman, Apex, NC (US)

(73) Assignee: Arkema Inc., King of Prussia, PA (US)

( * ) Notice: Subject to any disclaimer, the term of this patent is extended or adjusted under 35 U.S.C. 154(b) by 150 days.

(21) Appl. No.: 14/376,702

(22) PCT Filed: Feb. 5, 2013

(86) PCT No.: PCT/US2013/024698
§ 371 (c)(1),
(2) Date: Aug. 5, 2014

(87) PCT Pub. No.: WO2013/119521
PCT Pub. Date: Aug. 15, 2013

(65) Prior Publication Data
US 2015/0073080 A1    Mar. 12, 2015

Related U.S. Application Data

(60) Provisional application No. 61/597,452, filed on Feb. 10, 2012.

(51) Int. Cl.
*C09D 133/08* (2006.01)
*C08F 283/06* (2006.01)
*C09D 151/08* (2006.01)

(52) U.S. Cl.
CPC ........ *C09D 133/08* (2013.01); *C08F 283/065* (2013.01); *C09D 151/08* (2013.01)

(58) Field of Classification Search
CPC .. C09D 133/08; C09D 151/08; C08F 282/065
See application file for complete search history.

(56) References Cited

U.S. PATENT DOCUMENTS

| | | | |
|---|---|---|---|
| 5,064,888 A | 11/1991 | Farwaha et al. | |
| 5,399,617 A | 3/1995 | Farwaha et al. | |
| 5,530,056 A | 6/1996 | Farwaha et al. | |
| 5,610,225 A | 3/1997 | Farwaha et al. | |
| 5,618,876 A | 4/1997 | Farwaha et al. | |
| 6,124,397 A | 9/2000 | Smith | |
| 6,410,655 B2 | 6/2002 | Okubo et al. | |
| 6,933,415 B2 | 8/2005 | Zhao et al. | |
| 7,705,081 B2 | 4/2010 | Porzio et al. | |
| 7,705,082 B2 | 4/2010 | Porzio et al. | |
| 2005/0039635 A1* | 2/2005 | Yang | B01F 17/0028 106/31.89 |
| 2007/0105982 A1 | 5/2007 | Roschmann et al. | |
| 2007/0299180 A1 | 12/2007 | Joecken | |
| 2009/0186968 A1 | 7/2009 | Zong et al. | |
| 2009/0186972 A1 | 7/2009 | Zong et al. | |
| 2010/0016485 A1 | 1/2010 | Zong et al. | |
| 2011/0152439 A1 | 6/2011 | Wu et al. | |
| 2011/0189487 A1* | 8/2011 | Zacharias | C08F 220/06 428/413 |

FOREIGN PATENT DOCUMENTS

| | | |
|---|---|---|
| EP | 0 741 173 A2 | 11/1996 |
| EP | 1 106 660 B1 | 4/2010 |
| JP | 5301933 A2 | 11/1993 |
| WO | WO 2005/054384 A1 | 6/2005 |
| WO | WO 2006/052332 A2 | 5/2006 |
| WO | WO 2009/065867 A1 | 5/2009 |
| WO | WO 2009/091592 A1 | 7/2009 |

* cited by examiner

*Primary Examiner* — Peter D. Mulcahy
(74) *Attorney, Agent, or Firm* — Lynn B. Morreale

(57) ABSTRACT

Latex binders useful for preparing zero or low VOC coating compositions having excellent freeze-thaw stability, good tint strength and good scrub resistance when cured may be obtained using a polymerizable polyalkylene glycol monomer such as polyethylene glycol methacrylate in combination with one or both of an emulsifier or a polymerizable polyalkylene glycol monomer containing bulky hydrophobic groups substituted on an aromatic ring.

19 Claims, No Drawings

LATEX BINDERS USEFUL IN ZERO OR LOW VOC COATING COMPOSITIONS

CROSS-REFERENCE TO RELATED APPLICATIONS

This application is a national stage application under 35 U.S.C. §371 of PCT/US2013/24698, filed Feb. 5, 2013, which claims benefit to U.S. patent application 61/597,452 filed on Feb. 10, 2012.

FIELD OF THE INVENTION

The present invention relates to latex binders useful for preparing coating compositions containing low levels of, or which are substantially free of, volatile organic compounds (VOCs) such as volatile freeze-thaw additives, as well as to methods of preparing such latex binders and coating compositions.

BACKGROUND OF THE INVENTION

Latex coating compositions are utilized for a variety of applications, including, for example, as paints for various types of surfaces. However, such compositions are recognized as being potentially unstable when exposed to freeze-thaw cycles. That is, repeated freezing and warming of latex coating compositions can frequently lead to destabilization of the dispersed polymer in the latex (causing gel formation, for example). This, of course, is a significant problem since these coating compositions are expected to be exposed to a wide range of temperatures during shipment and storage. For this reason, various freeze-thaw additives have been formulated into latex coating compositions in order to improve their resistance to such temperature cycles. Traditionally, these additives have included relatively low molecular weight compounds such as alcohols, glycols and the like.

In recent years, however, such low molecular weight freeze-thaw additives have come under scrutiny since many are classified as volatile organic compounds (VOCs). Environmental regulations in many locations limit the level of VOCs that can be present in coating compositions. For this reason, there has been an effort to develop various new formulations that qualify as zero or low VOC yet still meet the freeze-thaw stability requirements expected in the industry. However, formulating a low VOC, freeze-thaw stable coating composition often compromises other important characteristics of the coating composition such as abrasion (scrub) resistance and tint strength.

BRIEF SUMMARY OF THE INVENTION

The present invention relates to an emulsion polymer composition (also referred to herein as a "latex binder") that is advantageous for use in formulating coating compositions having zero or low VOC content (e.g., less than 50 g/L VOCs). The latex binder contains a polymer formed by, for example, emulsion polymerization of ethylenically unsaturated monomers, including at least one acrylic monomer and a polymerizable polyalkylene glycol monomer such as an alkoxylated (meth)acrylate. The monomer mixture in one embodiment of the invention may contain a polymerizable polyalkylene glycol monomer containing a phenyl group substituted with bulky hydrophobic groups (e.g., styryl, butyl). In another embodiment, the latex binder contains an emulsifier which is an alkoxylated phenol substituted with bulky hydrophobic groups on the phenol moiety. This emulsifier may be added to an already-formed emulsion of the polymer and/or may be present during the emulsion polymerization forming the polymer.

It has been unexpectedly discovered that zero or low VOC coating compositions containing a latex binder in accordance with the present invention exhibit excellent freeze-thaw stability while maintaining good scrub resistance and tint strength. This combination of properties has previously been difficult to achieve.

In one aspect of the invention, a latex binder useful for preparing a zero or low VOC latex coating composition is provided which comprises:

a) a polymer which is a polymerization product of at least:
  i) at least one polymerizable polyalkylene glycol monomer corresponding to structural formula (I):

$$R^1-(XO)_x-R^2 \quad (I)$$

wherein $R^1$ is a first polymerizable moiety selected from the group consisting of (meth)acrylate, allyl, vinyl, maleate, itaconate and fumarate, X is a $C_2$-$C_3$ divalent alkylene group, x is 2 to 50, and $R^2$ is H or $CH_3$;
  ii) at least one acrylic monomer which is copolymerizable with the polymerizable polyalkylene glycol monomer of structural formula (I); and
  iii) optionally, at least one polymerizable polyalkylene glycol monomer of structural formula (II):

$$Ph-(OY)_n-R^6 \quad (II)$$

wherein Ph is a phenyl group substituted at the 2, 4 and 6 positions with groups $R^3$, $R^4$ and $R^5$ respectively, with $R^3$, $R^4$ and $R^5$ being independently selected from the group consisting of butyl, tert-butyl, isobutyl, $-CH_2$-A, and $-CH(CH_3)$-A, where A is phenyl or cyclohexyl, wherein Y is a divalent hydrocarbon radical comprising a linear or branched alkylene radical having from about 2 to 8 carbon atoms; wherein n is an integer of from 1 to 100; and wherein $R^6$ is a second polymerizable moiety selected from the group consisting of (meth)acrylate, allyl, vinyl, maleate, itaconate and fumarate;

b) water; and
c) at least one emulsifier;

subject to the proviso that if a polymerizable polyalkylene glycol monomer corresponding to structural formula (II) is not employed in the polymer the latex binder comprises an emulsifier corresponding to structural formula (III):

$$Ph-(OZ)_m-R^{10} \quad (III)$$

wherein Ph is a phenyl group substituted at the 2, 4 and 6 positions with groups $R^7$, $R^8$ and $R^9$ respectively, with $R^7$, $R^8$ and $R^9$ being independently selected from the group consisting of butyl, tert-butyl, isobutyl, $-CH_2$-E, and $-CH(CH_3)$-E, where E is phenyl or cyclohexyl; wherein Z is a divalent hydrocarbon radical comprising a linear or branched alkylene radical having from about 2 to 8 carbon atoms; wherein m is an integer of from 1 to 100; and wherein $R^{10}$ is selected from the group consisting of $-OH$, $-OCH_3$, $-OC_2H_5$, $-OC_3H_7$, $-OC_4H_9$, $-OC_5H_{11}$, $-OC_6H_{13}$, $-Cl$, $-Br$, $-CN$, phosphonate ($-PO_3^-M^+$), phosphate ($PO_4^-M^+$), sulfate ($SO_4^-M^+$), sulfonate ($SO_3^-M^+$), carboxylate ($CO_2^-M^+$), and a quaternary ammonium ion, wherein $M^+$ is a cation.

The Ph groups present in the polymerizable polyalkylene glycol monomer of structural formula (I) and the emulsifier of structural formula (III) are bulky hydrophobic groups which are believed to contribute to improved freeze-thaw stability, although the exact mechanism of action is not understood.

In another aspect of the invention, a latex binder useful for preparing a zero or low VOC latex coating composition is provided which comprises:

a) a polymer which is a polymerization product of at least:
i) at least one polymerizable polyalkylene glycol monomer corresponding to structural formula (I):

$$R^1-(XO)_x-R^2 \qquad (I)$$

wherein $R^1$ is a first polymerizable moiety selected from the group consisting of (meth)acrylate, allyl, vinyl, maleate, itaconate and fumarate, X is a $C_2$-$C_3$ divalent alkylene group, x is 2 to 50, and $R^2$ is H or $CH_3$;

ii) at least one acrylic monomer which is copolymerizable with the polymerizable polyethylene glycol monomer; and b) water; and
c) an emulsifier corresponding to structural formula (III):

$$Ph-(OZ)_m-R^{10} \qquad (III)$$

wherein Ph is a phenyl group substituted at the 2, 4 and 6 positions with groups $R^7$, $R^8$ and $R^9$ respectively, with $R^7$, $R^8$ and $R^9$ being independently selected from the group consisting of butyl, tert-butyl, isobutyl, —$CH_2$-E, and —$CH(CH_3)$-E, where E is phenyl or cyclohexyl; wherein Z is a divalent hydrocarbon radical comprising a linear or branched alkylene radical having from about 2 to 8 carbon atoms; wherein m is an integer of from 1 to 100; and wherein $R^{10}$ is selected from the group consisting of —OH, —$OCH_3$, —$OC_2H_5$, —$OC_3H_7$, —$OC_4H_9$, —$OC_5H_{11}$, —$OC_6H_{13}$, —Cl, —Br, —CN, phosphonate (—$PO_3^-M^+$), phosphate ($PO_4^-M^+$), sulfate ($SO_4^-M^+$), sulfonate ($SO_3^-M^+$), carboxylate ($CO_2^-M^+$), and a quaternary ammonium ion, wherein $M^+$ is a cation.

In another aspect of the invention, a method of making a latex binder useful for preparing a low or zero VOC coating composition is provided, wherein the method comprises:

a) forming an aqueous emulsion comprised of:
i) at least one polymerizable polyalkylene glycol monomer corresponding to structural formula (I):

$$R^1-(XO)_x-R^2 \qquad (I)$$

wherein $R^1$ is a first polymerizable moiety selected from the group consisting of (meth)acrylate, allyl, vinyl, maleate, itaconate and fumarate, X is a $C_2$-$C_3$ divalent alkylene group, x is 2 to 50, and $R^2$ is H or $CH_3$;

$$Ph-(OY)_n-R^6 \qquad (II)$$

wherein Ph is a phenyl group substituted at the 2, 4 and 6 positions with groups $R^3$, $R^4$ and $R^5$ respectively, with $R^3$, $R^4$ and $R^5$ being independently selected from the group consisting of butyl, tert-butyl, isobutyl, —$CH_2$-A, and —$CH(CH_3)$-A, where A is phenyl or cyclohexyl, wherein Y is a divalent hydrocarbon radical comprising a linear or branched alkylene radical having from about 2 to 8 carbon atoms; wherein n is an integer of from 1 to 100; wherein $R^6$ is a second polymerizable moiety selected from the group consisting of (meth)acrylate, allyl, vinyl, maleate, itaconate and fumarate;

ii) at least one acrylic monomer which is copolymerizable with the polymerizable polyethylene glycol monomer;

iii) optionally, at least one polymerizable polyalkylene glycol monomer corresponding to structural formula (II):

$$Ph-(OY)_n-R^6 \qquad (II)$$

wherein Ph is a phenyl group substituted at the 2, 4 and 6 positions with groups $R^3$, $R^4$ and $R^5$ respectively, with $R^3$, $R^4$ and $R^5$ being independently selected from the group consisting of butyl, tert-butyl, isobutyl, —$CH_2$-A, and —$CH(CH_3)$-A, where A is phenyl or cyclohexyl, wherein Y is a divalent hydrocarbon radical comprising a linear or branched alkylene radical having from about 2 to 8 carbon atoms; wherein n is an integer of from 1 to 100; and wherein $R^6$ is a second polymerizable moiety selected from the group consisting of (meth)acrylate, allyl, vinyl, maleate, itaconate and fumarate;

iv) water; and
v) at least one emulsifier;

subject to the proviso that if a polymerizable polyethylene glycol monomer corresponding to structural formula (II) is not present the aqueous emulsion comprises an emulsifier corresponding to structural formula (III):

$$Ph-(OZ)_m-R^{10} \qquad (III)$$

wherein Ph is a phenyl group substituted at the 2, 4 and 6 positions with groups $R^7$, $R^8$ and $R^9$ respectively, with $R^7$, $R^8$ and $R^9$ being independently selected from the group consisting of butyl, tert-butyl, isobutyl, —$CH_2$-E, and —$CH(CH_3)$-E, where E is phenyl or cyclohexyl; wherein Z is a divalent hydrocarbon radical comprising a linear or branched alkylene radical having from about 2 to 8 carbon atoms; wherein m is an integer of from 1 to 100; and wherein $R^{10}$ is selected from the group consisting of —OH, —$OCH_3$, —$OC_2H_5$, —$OC_3H_7$, —$OC_4H_9$, —$OC_5H_{11}$, —$OC_6H_{13}$, —Cl, —Br, —CN, phosphonate (—$PO_3^-M^+$), phosphate ($PO_4^-M^+$), sulfate ($SO_4^-M^+$), sulfonate ($SO_3^-M^+$), carboxylate ($CO_2^-M^+$), and a quaternary ammonium ion, wherein $M^+$ is a cation;

b) initiating polymerization of the polymerizable polyalkylene glycol monomer of structural formula (I), the polymerizable polyalkylene glycol monomer of structural formula (II), if present, and the acrylic monomer; and c) forming a polymer, in latex form, comprising polymerized units of the polymerizable polyalkylene glycol monomer of structural formula (I), the polymerizable polyalkylene glycol monomer of structural formula (II), if present, and the acrylic monomer.

DETAILED DESCRIPTION OF THE INVENTION

According to the present invention, it has been discovered that zero or low VOC coating compositions that have good freeze-thaw stability and which, when cured, have good abrasion resistance may be obtained using particular monomers and/or emulsifiers, but zero to low levels of volatile freeze-thaw additives. Freeze-thaw stability or being freeze-thaw stable generally is understood to mean that a composition does not gel in three or more F/T cycles, typically 5 or more F/T cycles. "Volatile freeze-thaw additive", as used herein, refers to those freeze-thaw additives which diffuse out from the applied film of the latex coating composition and evaporate under typical ambient conditions. By typical ambient conditions, it is meant those conditions of temperature, humidity and barometric pressure under which latex coating compositions are typically applied and cured.

The term "latex" is used herein in its conventional meaning, i.e. a dispersion of particulate matter in an aqueous phase which contains an emulsifier or surfactant suitable for preparing the latex. Latex binders, as used herein, comprise a polymer dispersed in an aqueous phase with an appropriate emulsifier or surfactant.

According to one embodiment of this invention, there are provided polymeric latex binders which comprise acrylic or styrene/acrylic polymers which are the polymerization products of, in addition to at least one acrylic monomer, at least one polymerizable polyalkylene glycol monomer of structure (I):

$$R^1\text{—}(XO)_x\text{—}R^2 \quad (I)$$

wherein $R^1$ is a first polymerizable moiety selected from the group consisting of (meth)acrylate, allyl, vinyl, maleate, itaconate and fumarate, X is a $C_2$-$C_3$ divalent alkylene group, x is 2 to 50, and $R^2$ is H or $CH_3$;

The polymers may further comprise 0 to 40 pphm of the polymerized residue of optional styrenic monomers, such as styrene, halogenated styrene and alkyl-substituted styrene, as well as other possible types of monomers as will be explained in more detail subsequently. Other optional monomers include ionic monomers to impart mechanical stability and monomers to enhance wet adhesion. In another embodiment of the invention, latex coating compositions utilize the latex binders of the present invention in amounts effective to provide a coating composition which is freeze-thaw stable and which has good abrasion (scrub) resistance and tint strength, but low levels of VOCs. In one aspect, the VOC level of the coating composition is less than 50 g/L.

The latex binders of this invention are particularly advantageous for use in aqueous coating compositions. The first advantage of these binders is that they permit the formulation of aqueous coatings having adequate film formation and a desirable balance of hardness, scrub resistance, and tint strength. The second advantage is that they can be used to formulate latex paints and other such compositions which require little or no volatile freeze-thaw additive, such as ethylene glycol or propylene glycol, yet which exhibit excellent freeze-thaw stability. In one embodiment, the latex binders and the coating compositions of the present invention are substantially free of any volatile freeze-thaw additive. One will recognize that small amounts of volatile freeze-thaw additives may be added if desired, although they should not be present in any appreciable amounts and are not required in the present invention.

Polymerizable Polyalkylene Glycol Monomer—Structural Formula (I)

The latex binders of the present invention include at least one polymer containing as part of the polymer backbone one or more repeating units derived from a polymerizable polyalkylene glycol monomer corresponding to structural formula (I):

$$R^1\text{—}(XO)_x\text{—}R^2 \quad (I)$$

wherein $R^1$ is a first polymerizable moiety selected from the group consisting of (meth)acrylate (i.e., acrylate or methacrylate), allyl, vinyl, maleate, itaconate and fumarate, X is a $C_2$-$C_3$ divalent alkylene group, x is 2 to 50 (in another embodiment, 4 to 25), and $R^2$ is H or $CH_3$. Mixtures of such monomers can be used to prepare the polymer, if so desired.

In one embodiment of the invention, X is ethylene (—$CH_2CH_2$—). X can be a mixture of different alkylene groups; i.e., the polyoxyalkylene moiety within the monomer can include varying oxyalkylene groups in random or block sequence, such as a random mixture of oxyethylene and oxypropylene (e.g., —$CH_2CH(CH_3)O$—) groups.

The monomer of structural formula (I) may be an admixture of compounds with varying values of x, as a consequence of the usual method of preparing such monomers which involves alkoxylation of an active hydrogen-containing starter molecule, resulting in a reaction product having a range of degrees of alkoxylation. In such situations, the x values previously mentioned refer to average values of x for the monomer admixture.

Polyethylene glycol methacrylate is a specific example of a monomer having structural formula (I) which is suitable for use in the present invention.

Polymerizable polyalkylene glycol monomers corresponding to structural formula (I) are well known in the art and are described, for example, in U.S. Pat. Nos. 5,530,056 and 5,610,225, each incorporated herein by reference in its entirety for all purposes. Such monomers are also available from commercial sources.

The number average molecular weight of the polyalkylene glycol moiety contained in the polymerizable polyalkylene glycol monomer of structure (I) may be from about 175 to about 1,100, alternatively from about 200 to about 1,000. In one embodiment, the number average molecular weight of this moiety is less than about 900 and in yet another embodiment is from about 200 to about 880. The monomer may be used in amounts effective to impart freeze-thaw stability to the latex binder or to a coating composition prepared using the latex binder without the use of a volatile freeze-thaw additive, taking into account the amounts of the substances corresponding to structural formulae (II) and (III) which typically also contribute to the freeze-thaw stability. The amount of polymerizable polyalkylene glycol monomer of structural formula (I) employed may depend on factors such as pigment/volume concentration, relative hydrophilicity of the polymer, surfactant (emulsifier) systems and the like. One skilled in the art, once armed with the present specification, would be able to determine how much of the monomer of structural formula (I) should be used to prepare a particular latex binder to be used in a particular latex coating composition. For example, the polymer may comprise the polymerized residue of from about 0.5 to about 6 parts by weight, or about 1 to about 4 parts by weight, of the polymerizable polyalkylene glycol monomer of structural formula (I) per 100 parts by weight of total monomer(s) used to prepare the polymer (pphm).

Polymerizable Polyalkylene Glycol Monomer—Structural Formula (II)

In one embodiment of the invention, at least one polymer present in the latex coating composition contains as part of the polymer backbone one or more repeating units derived from a polymerizable polyalkylene glycol monomer corresponding to structural formula (II):

$$Ph\text{—}(OY)_n\text{—}R^6 \quad (II)$$

wherein Ph is a phenyl group substituted at the 2, 4 and 6 positions with groups $R^3$, $R^4$ and $R^5$ respectively, with $R^3$, $R^4$ and $R^5$ being independently selected from the group consisting of butyl, tert-butyl, isobutyl, —$CH_2$-A, and —CH($CH_3$)-A, where A is phenyl or cyclohexyl, wherein Y is a divalent hydrocarbon radical comprising a linear or branched alkylene radical having from about 2 to 8 carbon atoms; wherein n is an integer of from 1 to 100; wherein $R^6$ is a second polymerizable moiety selected from the group consisting of (meth)acrylate, allyl, vinyl, maleate, itaconate and fumarate.

In certain embodiments of the invention, n is an integer of from 4 to 80, from 8 to 25, from 4 to 60, from 10 to 50, or from 10 to 25. The monomer of structural formula (II) may be an admixture of compounds with varying values of n, as a consequence of the usual method of preparing such monomers which involves alkoxylation of an active hydrogen-containing starter molecule, resulting in a reaction product having a range of degrees of alkoxylation. In such situations, the n values previously mentioned refer to average values of n for the monomer admixture.

In one embodiment of the invention, X is ethylene ($-CH_2CH_2-$). X can be a mixture of different alkylene groups; i.e., the polyoxyalkylene moiety within the monomer can include varying oxyalkylene groups in random or block sequence, such as a random mixture of oxyethylene and oxypropylene (e.g., $-CH_2CH(CH_3)O-$) groups.

A tristyrylphenol ethoxylate (meth)acrylate, where $R^3$, $R^4$ and $R^5$ are each $-CH(CH_3)$-A, where A is phenyl, Y is ethylene, and $R^6$ is acrylate or methacrylate is a specific example of a monomer having structural formula (II) which is suitable for use in the present invention. A tributylphenol ethoxylate (meth)acrylate, where $R^3$, $R^4$ and $R^5$ are each $-C_4H_9$, Y is ethylene, and $R^6$ is acrylate or methacrylate, is another exemplary suitable monomer.

If the latex binder does not contain an emulsifier in accordance with structural formula (III), at least some amount of one or more polymerizable polyalkylene glycol monomers of structural formula (II) is utilized as a comonomer in preparing the polymer incorporated in the latex binder and coating composition prepared therefrom. In various embodiments of the invention, the monomer(s) of structural formula (II), if present, may comprise, for example, at least about 0.1, at least about 0.5, at least about 1, at least about 1.5, or at least about 2 parts by weight per hundred parts by weight of the total monomer used to prepare the polymer. In other various embodiments, the amount of monomer of structural formula (II) does not exceed about 6, about 5, about 4, or about 3 pphm.

Monomers in accordance with structural formula (II) are well known in the art and are described, for example, in the following United States published applications, each of which is incorporated herein by reference in its entirety for all purposes: 2009/0186972; 2010/0016485; and 2009/0186968.

Acrylic Monomer

The polymer also comprises the polymerized residue of at least one acrylic monomer which is copolymerizable with the polymerizable polyalkylene glycol monomer of structural formula (I) (and structural formula (II), if such type of monomer is utilized). The acrylic monomer may be selected from the group consisting of $C_1$-$C_{10}$ alkyl esters of alpha, beta-ethylenically unsaturated $C_2$-$C_6$ monocarboxylic acids; hydroxy $C_1$-$C_{10}$ alkyl esters of alpha, beta-ethylenically unsaturated $C_2$-$C_6$ monocarboxylic acids; and $C_1$-$C_{10}$ alkyl di-esters of alpha, beta-ethylenically unsaturated $C_4$-$C_8$ dicarboxylic acids. In one embodiment, the acrylic monomer is selected from the group consisting of $C_1$-$C_{10}$ alkyl esters of acrylic and methacrylic acid and $C_1$-$C_{10}$ alkyl di-esters of maleic, itaconic and fumaric acids. In another embodiment, at least one $C_1$-$C_8$ alkyl ester of acrylic acid is utilized. Exemplary acrylic monomers include methyl acrylate, ethyl acrylate, butyl acrylate, 2-ethyl hexyl acrylate, decyl acrylate, methyl methacrylate, butyl methacrylate, isobutyl methacrylate, iso-bornyl methacrylate, hydroxyethyl acrylate, hydroxyethyl methacrylate, and mixtures thereof. In various embodiments of the invention, one or more $C_1$-$C_8$ alkyl (meth)acrylates (in particular, a mixture of butyl acrylate and methyl methacrylate) comprise at least 50 weight %, at least 60 weight %, at least 70 weight %, at least 80 weight %, or at least 90 weight % of the total amount of monomer used to prepare the polymer.

Other Monomer(s)

The polymer may also comprise 0 to 4 pphm of the polymerized residue of an ionic monomer. In certain embodiments, not more than about 2 pphm of the ionic monomer is used. The ionic monomers may be utilized to impart mechanical stability to the latex binder and the latex coating compositions, i.e., they are stable upon application of shear to the latex binders or coating compositions, such as during pumping of the latex binder and/or the coating compositions during processing and during addition of the latex binder to the "grind" portion of the coating formulation during the preparation thereof. The "grind" is that portion of the coating formulation which includes the pigments, fillers and the like. The pigments and fillers are "ground" using conventional mixing techniques, to a particular Hegman dispersion value. The grind is then "let down", that is, the balance of the coating composition, including the latex binder and any balance of water, are added to the grind and mixed. Typical classes of ionic monomers include, but are not limited to, alpha, beta-ethylenically unsaturated $C_3$-$C_8$ monocarboxylic and $C_4$-$C_8$ dicarboxylic acids, including the anhydrides thereof, and the $C_4$-$C_8$ alkyl half-esters of the alpha, beta-ethylenically unsaturated $C_4$-$C_8$ dicarboxylic acids. Exemplary ionic monomers include acrylamido methylpropane, sulfonic acid, styrene sulfonate, sodium vinyl sulfonate, acrylic acid and methacrylic acid, and the $C_4$-$C_8$ alkyl half esters of maleic acid, maleic anhydride, fumaric acid, and itaconic acid. Suitable ionic monomers include acrylic acid and methacrylic acid.

In order to improve the wet adhesion of the latex coating composition, the polymer may comprise 0 to about 5 or 0 to about 4 pphm of the polymerized residue of a wet adhesion monomer, or a combination of wet adhesion monomers. These monomers are well known in the art and include amino-, urea- and ureido-functionalized monomers containing ethylenic unsaturation (as provided, for example, by (meth)acrylate or (meth)acrylamide groups) such as aminoethyl (meth)acrylate, dimethylaminopropyl (meth)acrylate, 3-dimethylamino-2,2-dimethylpropyl-1-(meth)acrylate, 2-N-morpholinoethyl (meth)acrylate, 2-N-piperidinoethyl (meth)acrylate, N-(3-dimethylaminopropyl) (meth)acrylamide, N-(3-dimethylamino-2, 2-dimethylpropyl)(meth)acrylamide, N-dimethylaminomethy) (meth)acrylamide, N-dimethylaminomethyl (meth)acrylamide, N-(4-morpholinomethyl) (meth)acrylamide, vinylimidazole, vinylpyrrolidone, N-(2-methacryloyloxyethyl) ethylene urea, N-(2-methacryloxyacetamidoethyl)-N,N'-ethyleneurea, allylalkyl ethylene urea, N-methacrylamidomethyl urea, N-methacryloyl urea, N43-(1,3-diazacryclohexan)-2-onpropylmethyacrylamide, 2-(1-imidazolyl)ethyl methacrylate, 2-(1-imidazolidin-2-on)ethylmethacrylate, N-(methacrylamido)ethyl urea and allyl ureido wet adhesion monomer and mixtures thereof. When used, the wet adhesion monomer may, for example, be typically present in an amount from 0.2 to 2.0 pphm.

Other suitable comonomers include any of the polymerizable monomers known in the latex polymer art, including, for example and without limitation, styrenic monomers (e.g., styrene, alpha-methylstyrene), vinyl chloride, (meth)acrylamide, (meth)acrylonitrile, ureido (meth)acrylate, vinyl acetate, vinyl esters of branched tertiary monocarboxylic acids (such the vinyl esters commercially available under the trademarks VEOVA and EXXAR), itaconic acid, maleic acid, crotonic acid, fumaric acid, ethylene, and $C_4$-$C_8$ conjugated dienes.

In one embodiment of the invention, one or more carbonyl-containing monomers (such as a monomer bearing an acetoacetate functionality) may be utilized as comonomers. Examples of acetoacetate moiety containing monomers include 2-acetoacetoxyethyl (meth)acrylate, 3-acetoacetoxypropyl (meth)acrylate, 4-acetoacetoxybutyl (meth)acrylate, 2-cyanoacetoxyethyl (meth)acrylate, 3-cyanoacetoxypropyl (meth)acrylate, 4-cyanoacetoxybutyl (meth)acrylate, N-(2-acetoacetoxyethyl) (meth)acrylamide, allyl acetoacetate, 2,3-di(acetoacetoxy)propyl (meth)acrylate, and vinyl acetoacetate. Crosslinking reactions involving such carbonyl-containing monomers may be achieved by adding carbonyl-reactive crosslinking agents or compounds to the polymer. Crosslinking of the polymer may take place during drying of a film of the latex coating composition.

Examples of carbonyl-reactive compounds include polyfunctional amines, hydrazine, alkyl dihydrazines, alkylene dioxime ethers, and dihydrazides of dicarboxylic acids. For example, ambient crosslinking chemistry such as diacetone acrylamide in conjunction with adipic dihydrazide can be incorporated into the latex binder.

In one embodiment of the invention, the polymer contains 0 to 20 or 0 to 10 pphm of one or more of the above-mentioned comonomers.

The various monomers used to prepare the polymers of the present invention may be selected to provide the desired properties in the polymers such as, for example, glass transition temperature (Tg).

In one embodiment of the invention, the polymer is a polymerization product of 45-65 pphm butyl acrylate, 35-45 pphm methyl methacrylate, 0.1-2 pphm ionic monomer (e.g., methacrylic acid), 0.5-6 pphm wet adhesion monomer, and 0.3-5 pphm polyethylene glycol methacrylate.

Methods of Preparing the Latex Binder

The emulsion polymerization of the selected monomers to obtain the desired latex binder containing the polymer can be accomplished by known procedures for polymerization in aqueous emulsion. Optionally, conventional seeding procedures can be employed to aid in controlling polymerization to achieve the desired average particle size and particle size distribution. If seeding is employed, the polymer seed can, for example, be present in amounts that correspond to about 0.1% to 8% by weight of the total polymer, and may, for example, range in size from about 20% to 60% of the diameter of the polymer particles to be formed.

The seed latex can constitute a previously prepared latex or polymer powder, or it can be prepared in situ. The monomeric composition of the seed latex can vary; however, in one embodiment it is substantially the same as that of the polymer.

The monomer or comonomers and, optionally, the seed to be employed in the preparation of the polymer, are dispersed into water with agitation sufficient to emulsify the mixture. The aqueous medium may also contain a free radical polymerization catalyst (such as a thermal initiator or a redox initiator system comprised of an oxidizing agent and a reducing agent), an emulsifier (i.e., surfactant), or other ingredients that are known and conventionally employed in the art as emulsion polymerization aids.

Suitable free radical polymerization catalysts are the catalysts known to promote emulsion polymerization and include water-soluble oxidizing agents, such as organic peroxides (e.g., t-butyl hydroperoxide, cumene hydroperoxide, etc.), inorganic oxidizing agents (e.g., hydrogen peroxide, potassium persulfate, sodium persulfate, ammonium persulfate, etc.) and those catalysts that are activated in the water phase by a water-soluble reducing agent. Such catalysts are employed in a catalytic amount sufficient to cause polymerization (e.g., free radical polymerization). As a general rule, a catalytic amount ranges from about 0.1 to 5 pphm. As alternatives to heat or catalytic compounds to activate the polymerization, other free radical producing means, such as exposure to activating radiation, can be employed.

Suitable emulsifying agents include anionic, cationic, and nonionic emulsifiers customarily used in emulsion polymerization, including mixtures of different emulsifiers. For example, at least one anionic emulsifier in combination with more nonionic emulsifiers may also be utilized. Representative anionic emulsifiers are the alkyl aryl sulfonates, alkali metal alkyl sulfates, the sulfonated alkyl esters, and fatty acid soaps. Specific examples include sodium dodecylbenzene sulfonate, sodium butylnaphthalene sulfonate, sodium lauryl sulfate, disodium dodecyl diphenyl ether disulfonate, N-octadecyl disodium sulfosuccinate and dioctyl sodium sulfosuccinate. The emulsifying agents are employed in amounts to achieve adequate emulsification and to provide the desired particle size and particle size distribution.

Emulsifier Having Structural Formula (III)

In one embodiment of the invention, the latex binder and/or coating composition prepared therefrom includes at least one emulsifier in accordance with structural formula (III):

$$Ph-(OZ)_m-R^{10} \qquad (III)$$

wherein Ph is a phenyl group substituted at the 2, 4 and 6 positions with groups $R^7$, $R^8$ and $R^9$ respectively, with $R^7$, $R^8$ and $R^9$ being independently selected from the group consisting of butyl, tert-butyl, isobutyl, —$CH_2$-E, and —CH($CH_3$)-E, where E is phenyl or cyclohexyl, wherein Z is a divalent hydrocarbon radical comprising a linear or branched alkylene radical having from about 2 to 8 carbon atoms; wherein m is an integer of from 1 to 100; wherein $R^{10}$ is selected from the group consisting of —OH, —$OCH_3$, —$OC_2H_5$, —$OC_3H_7$, —$OC_4H_9$, —$OC_5H_{11}$, —$OC_6H_{13}$, —Cl, —Br, —CN, phosphonate (—$PO_3^-M^+$), phosphate ($PO_4^-M^+$), sulfate ($SO_4^-M^+$), sulfonate ($SO_3^-M^+$), carboxylate ($CO_2^-M^+$), and a quaternary ammonium ion, wherein $M^+$ is a cation.

In certain embodiments of the invention, m is an integer of from 4 to 80, from 8 to 25, from 4 to 60, from 10 to 50, or from 10 to 25. The emulsifier of structural formula (III) may be an admixture of compounds with varying values of m, as a consequence of the usual method of preparing such emulsifiers which involves alkoxylation of an active hydrogen-containing starter molecule, resulting in a reaction product having a range of degrees of alkoxylation. In such situations, the m values previously mentioned refer to average values of m for the emulsifier admixture.

In one embodiment of the invention, Z is ethylene (—$CH_2CH_2$—). Z can be a mixture of different alkylene groups; i.e., the polyoxyalkylene moiety within the emulsifier can include varying oxyalkylene groups in random or block sequence, such as a random mixture of oxyethylene and oxypropylene (e.g., —$CH_2CH(CH_3)O$—) groups.

A tristyrylphenol ethoxylate, where $R^7$, $R^8$ and $R^9$ are each —CH($CH_3$)-A, where A is phenyl, Z is ethylene, and $R_{10}$ is —OH, is a specific example of an emulsifier having structural formula (III) which is suitable for use in the present invention. A tributylphenol ethoxylate, where $R^7$, $R^8$ and $R^9$ are each —$C_4H_9$, Z is ethylene, and $R^{10}$ is —OH, is another exemplary suitable emulsifier.

If the coating composition does not comprise a polymer containing, as part of its backbone, one or more moieties derived from a polymerizable polyalkylene glycol monomer in accordance with structural formula (II), at least some amount of one or more emulsifiers of structural formula (III) is utilized as an emulsifier in preparing the latex incorporated in the coating composition and/or is used as an additive to an already formed aqueous dispersion of latex polymer. Such emulsifiers may be used in combination with one or more other types of emulsifiers. In various embodiments of the invention, the emulsifier(s) of structural formula (III), if present, may comprise, for example, at least about 0.1, at least about 0.5, at least about 1, at least about 1.5, or at least about 2 parts by weight per hundred parts by weight of the total monomer used to prepare the polymer. In other various embodiments, the amount of emulsifier of structural formula (III) does not exceed about 6, about 5, about 4, or about 3 pphm.

Emulsifiers in accordance with structural formula (III) are well known in the art and are described, for example, in the following United States published applications, each of which is incorporated herein by reference in its entirety for all purposes: 2009/0186972; 2010/0016485; and 2009/0186968. Emulsifiers corresponding to structural formula (III) are also available from commercial sources, such as Rhodia.

Other ingredients known in the art to be useful for various specific purposes in emulsion polymerization, such as, acids, salts, chain transfer agents, and chelating agents, can also be employed in the preparation of the polymer. For example, if the polymerizable constituents include a monoethylenically unsaturated carboxylic acid monomer, polymerization under acidic conditions (pH 2 to 7, preferably 2 to 5) is preferred. In such instances, the aqueous medium can include those known weak acids and their salts that are commonly used to provide a buffered system at the desired pH range.

The manner of combining the polymerization ingredients can be by various known monomer feed methods, such as continuous monomer addition, incremental monomer addition, or addition in a single charge of the entire amount of monomers. The entire amount of the aqueous medium with polymerization additives can be present in the polymerization vessel before introduction of the monomers, or alternatively, the aqueous medium, or a portion of it, can be added continuously or incrementally during the course of the polymerization.

Polymerization is initiated by heating the emulsified mixture with continued agitation to a temperature usually between about 50° to 100° C. Polymerization is continued by maintaining the emulsified mixture at the selected temperature until the desired degree of conversion of the monomer or monomers to polymer has been reached.

Following polymerization, the solids content of the resulting aqueous heterogeneous polymer latex can be adjusted to the level desired by the addition of water or by the removal of water by distillation. Generally, the desired level of polymeric solids content is from about 20 to 60% by weight on a total weight basis.

The size of the polymer particles can vary; however, for better water resistance, in one embodiment the particles have an average diameter of less than 500 nanometers. In another embodiment, the polymer has a particle size in the range of from about 0.1 to about 0.3 microns. Suitable particle sizes generally can be achieved directly from the polymerization. However, screening of the resulting latex to remove particles outside the desired size range, and thus narrowing the particle size distribution, may be employed.

Other Additives

For various applications, it is sometimes desirable to have small amounts of additives, such as surfactants, bactericides, pH modifiers and antifoamers, incorporated in the latex coating composition. This may be done in a conventional manner and at any convenient point in the preparation of the latex coating compositions.

The aqueous coating compositions of the invention may include less than 2% by weight or less than 1.0% by weight of volatile anti-freeze agents based on the total weight of the aqueous coating composition. In another embodiment, the aqueous coating compositions are substantially free of volatile anti-freeze agents.

The aqueous coating composition may include at least one pigment. The term "pigment" as used herein includes non-film-forming solids such as pigments, extenders, and fillers. The at least one pigment may, for example, be selected from the group consisting of $TiO_2$ (in both anastase and rutile forms), clay (aluminum silicate), $CaCO_3$ (in both ground and precipitated forms), aluminum oxide, silicon dioxide, magnesium oxide, talc (magnesium silicate), barytes (barium sulfate), zinc oxide, zinc sulfite, sodium oxide, potassium oxide and mixtures thereof. Typically, the at least one pigment includes at least one of $TiO_2$, $CaCO_3$ or clay. Generally, the mean particle sizes of the pigments may range from about 0.01 to about 50 microns. For example, $TiO_2$ particles used in the aqueous coating composition may have a mean particle size of from about 0.15 to about 0.40 microns. The pigment can be added to the aqueous coating composition as a powder or in slurry form. The pigment is typically present in the final formulated coating composition in an amount from about 5 to about 50 percent by weight, more typically from about 10 to about 40 percent by weight.

The coating composition can optionally contain additives such as one or more film-forming aids or coalescing agents. Suitable firm-forming aids or coalescing agents include plasticizers and drying retarders such as high boiling point polar solvents. Other conventional coating additives such as, for example, dispersants, additional surfactants (i.e. wetting agents), rheology modifiers, defoamers, thickeners, biocides, mildewcides, colorants such as colored pigments and dyes, waxes, perfumes, co-solvents, and the like, can also be used in accordance with the invention. These additives are typically present in the aqueous coating composition in an amount from 0 to about 15% by weight, more typically from about 1 to about 10% by weight, based on the total weight of the coating composition.

As mentioned above, the aqueous coating composition in some embodiments can include less than 2.0% of anti-freeze agents based on the total weight of the aqueous coating composition. Exemplary anti-freeze agents include ethylene glycol, diethylene glycol, propylene glycol, glycerol (1,2,3-trihydroxypropane), ethanol, methanol, 1-methoxy-2-propanol, 2-amino-2-methyl-1-propanol, and FTS-365 (a freeze-thaw stabilizer from Inovachem Specialty Chemicals). More typically, the aqueous coating composition includes less than 1.0% or is substantially free (e.g. includes less than 0.1%) of anti-freeze agents. Accordingly, the aqueous coating composition of the invention typically has a VOC level of less than about 100 g/L and more typically less than or equal to about 50 g/L. Despite the fact that the aqueous coating compositions of the invention include little or no volatile anti-freeze agents, the compositions possess freeze-thaw stabilities at levels desirable in the art.

The balance of the aqueous coating composition of the invention may be water. Although much of the water is present in the latex binder and in other components of the aqueous coating composition, water is generally also added separately to the aqueous coating composition. Typically, the aqueous coating composition includes from about 10% to about 85% by weight and more typically from about 35% to about 80% by weight water. Stated differently, the total solids content of the aqueous coating composition is typically from about 15% to about 90%, more typically, from about 20% to about 65%.

The coating compositions are typically formulated such that the dried coatings comprise at least 10% by volume of dry polymer solids, and additionally 5 to 90% by volume of non-polymeric solids in the form of pigments. The dried coatings can also include additives such as plasticizers, dispersants, surfactants, rheology modifiers, defoamers, thickeners, biocides, mildewcides, colorants, waxes, and the like, that do not evaporate upon drying of the coating composition.

The aqueous coating compositions of the present invention are typically in the form of stable fluids that can be applied to a wide variety of materials such as, for example, metal, wood, paper, cardboard, composites, plastics, concrete, glass, ceramics, plaster, dry wall, other coatings, cloth, foams, and the like. The substrate may have been previously painted, primed, undercoated, sanded, conversion coated, oxidized, chemically treated, etched, or the like. The coating composition may be applied to the material or substrate by any suitable method such as, for example, dipping, brushing, spraying, roller coating, knife coating, or the like. Typically, a thin uniform layer (film) of the coating composition is formed on the substrate surface and then dried to form a dry coating. Drying may be accelerated by heating, if so desired. Multiple dry coating layers may be formed by applying successive layers of the coating composition. The latex binders of the present invention are suitable for use in a wide range of both interior and exterior zero to low VOC paints from gloss to flat.

The coating compositions of the invention may also be readily adapted for use in pressure sensitive adhesives, caulks and sealants, in addition to paints.

EXAMPLES

The following methods were used to characterize the coating compositions (paints) prepared in accordance with the examples.

Freeze-thaw stability was measured using a modified ASTM D2243-82 procedure: 1) Fill half pint cans with full with paint; Measure and record initial KU viscosity; 2) Cans are placed in a freezer at 0° F. for approximately 16 to 18 hours and then thawed at room temperature for 24 hours; KU viscosity is measured if the paints appear to be fluid; 3) Step 2 and 3 are repeated 5 times or until the paint is coagulated irreversibly.

Scrub Resistance was measured using the procedure of ASTM D-2486-79 (7 day dry).

Tint Strength: 1) Weigh the test paint into a half-pint can and 2 oz of phthalo blue from the colorant dispenser. 2) Shake on a red devil shaker for 3-5 minutes. 3) Make drawdowns on Leneta 1B chart using a 3 mil bird bar, 4) Let drawdowns dry for 1 day, measure Y % brightness value on a colorimeter. The % tint strength is calculated by the Kubelka-Monk formula.

Latex binders (emulsion polymers) were prepared as follows:

Comparative Example 1

Into a three-liter, jacketed glass reactor equipped with dual impellers, reflux condensers, and stainless steel feed lines, was added 15.75 g of a seed latex and 500 g water. The reactor was then heated to 75° C. The monomers (589 gram butyl acrylate, 419 gram methyl methacrylate, 31.5 g Rohamere® 6852 N-(2-methacryloyloxyethyl)-N,N'-ethylene urea, 5.3 g methacrylic acid) were combined with 240 g water and 49.0 g Rhodacal® A-246/L sodium $C_{14}$-$C_{16}$ alpha-olefin sulfonate and emulsified under agitation. The oxidizer solution was prepared by mixing 7.0 g t-butyl hydroperoxide (tBHP) in 72 g water. The reducer solution was prepared by dissolving 4.6 gram sodium metabisulfite (SMBS) into 72 g water. Commencing simultaneously, monomer preemulsion, ammonium hydroxide solution, oxidizer and reducer solutions were fed to the reactor over 210 minutes and 220 minutes, respectively. The temperature was maintained at 75° C. After the end of oxidizer and reducer feeds, the reactor was held at 75° C. for 30 minutes. Then, 3.2 g t-BHP and 2.3 g SMBS in aqueous solutions were fed over 60 minutes to lower residual monomers. The pH of the resulting latex was adjusted to approximately 8.5 to 9.5 with 28% ammonium hydroxide. The solid content of the latex was ~50%.

Comparative Example 2a-2c

2%~4% PEGMA

Comparative latex binders 2a, 2b and 2c were prepared using the same procedure as described in Comparative Example 1, except that poly(ethylene glycol) methacrylate ("PEGMA") was included in the monomer pre-emulsion at 2, 3 and 4 parts per hundred monomer (pphm), respectively.

Comparative Examples 3a and 3b

4% and 6% Emulsifier DV-9407

Comparative latex binders 3a and 3b were prepared using the same procedure as described in Comparative Example 1, except that Rhodacal® A-246L sodium alpha-olefin sulfonate was replaced with DV-9407 tristyrylphenol ethoxylate ("TSPEO"; from Rhodia) as the sole emulsifier in the monomer pre-emulsion at 4 and 6 parts per hundred monomer (pphm) respectively.

Comparative Examples 4a and 4b

Comparative latex binders 4a and 4b were prepared using the same procedure as described in Comparative Example 1, except that Sipomer® SEM-25 tristyrylphenol ethoxylate methacrylate ("TSPEOMA"; from Rhodia) was included in the monomer pre-emulsion at 2 and 4 parts per hundred monomer (pphm) respectively.

Example 1

In Accordance with the Invention

The latex binder was prepared using the same procedure as described in Comparative Example 1, except that 2 pphm of PEGMA was added and 2 pphm of DV9407 tristyrylphenol ethoxylate ("TSP-EO") was used to replace Rhodacal® A-246L sodium alpha-olefin sulfonate.

TABLE 1

Compositions of Example Emulsion Polymers (Latex Binders)

| Latex Binder | CE1 | CE2a | CE2b | CE2c | CE3a | CE3b | CE4a | CE4b | E1 |
|---|---|---|---|---|---|---|---|---|---|
| PEGMA, pphm | 0 | 2 | 3 | 4 | 0 | 0 | 0 | 0 | 2 |
| TSPEOMA, pphm | 0 | 0 | 0 | 0 | 0 | 0 | 2 | 4 | 0 |
| TSP-EO, pphm | 0 | 0 | 0 | 0 | 4 | 6 | 0 | 0 | 2 |

Preparation of Coating Compositions

The grind substances listed in Table 2 were ground for 45 minutes to 1 hour (depending on viscosity) in a high speed COWLES mixer. The letdown substances were then blended with the grind substances using an overhead mixer to form the coating compositions.

TABLE 2

Example of a Zero or Low VOC Paint Formulation (Coating Composition)

| Ingredient | Pounds | Gallons |
|---|---|---|
| Grind | | |
| Water | 102.0 | 12.2 |
| Cellosize ® QP4400[1] | 4.0 | 0.4 |
| Ethylene glycol | 12.0 | 1.4 |
| Amp95 ®[2] | 5.0 | 0.6 |
| Drewplus ® L475[3] | 2.0 | 0.3 |
| Proxel ® GXL[4] | 1.9 | 0.2 |
| Tamol ® 1124[5] | 10.0 | 1.1 |
| Kronos ® 4311[6] | 325.0 | 16.9 |
| Polygloss ® 90[7] | 50.0 | 2.7 |
| Letdown | | |
| Latex Binder | 520.1 | 58.6 |
| Water | 109.9 | 13.2 |
| Total | 1141.9 | 107.7 |
| Weight solids, % | 50.1 | |
| Volume solids, % | 36.5 | |
| PVC[8], % | 30.2 | |
| VOC, g/L | 49.6 | |

[1]Hydroxyethylcellulose (Cellosize)
[2]Co-dispersant and neutralizing primary amine alcohol (DowChemical)
[3]Foam control agent (Drew Chemical Corporation)
[4]Biocide (Arch Chemicals)
[5]Hydrophilic copolymer pigment dispersant (Dow Chemical)
[6]Titanium dioxide (Kronos)
[7]Kaolin (KaMin Performance Minerals)
[8]Pigment Volume Concentration

TABLE 3

Properties of the Zero or Low VOC Paint Formulation

| Latex | CE1 | CE2a | CE2b | CE2c | CE3a | CE3b | CE4a | CE4b | E1 |
|---|---|---|---|---|---|---|---|---|---|
| Normalized scrub, % | 100 | 81 | 72 | 63 | 102 | 122 | 98 | 48 | 100 |
| FT cycles | Failed | Failed | Failed | 5 | Failed | Failed | Failed | 5 | 5 |
| KU change after FT | | | | 3 | | | | 11 | 1 |
| Tint strength, % | 100.00 | 96.1 | 87 | 97.7 | 96.6 | 99.1 | 100.1 | 102.1 | 101.8 |

Example E1, in accordance with the invention, was the only example which provided a coating composition which simultaneously was freeze-thaw stable and had good scrub resistance and good tint strength. This result was surprising, particularly in view of the relatively low amounts of each of the PEGMA and TSP-EO used to prepare the latex binder.

What is claimed is:

1. A polymer latex binder useful in a zero or low VOC latex coating composition comprising:
   a) a polymer which is a polymerization product of at least:
      i) at least one polymerizable polyalkylene glycol monomer corresponding to structural formula (I):

$$R^1\text{—}(XO)_x\text{—}R^2 \qquad (I)$$

wherein $R^1$ is a first polymerizable moiety selected from the group consisting of (meth)acrylate, allyl, vinyl, maleate, itaconate and fumarate, X is a $C_2$-$C_3$ divalent alkylene group, x is from 4 to 25, and $R^2$ is H or $CH_3$;
      ii) at least one acrylic monomer which is copolymerizable with the polymerizable polyalkylene glycol monomer;
      iii) optionally, at least one polymerizable polyalkylene glycol monomer corresponding to structural formula (II):

$$Ph\text{—}(OY)_n\text{—}R^6 \qquad (II)$$

wherein Ph is a phenyl group substituted at the 2, 4 and 6 positions with groups $R^3$, $R^4$ and $R^5$ respectively, with $R^3$, $R^4$ and $R^5$ being independently selected from the group consisting of butyl, tert-butyl, isobutyl, —$CH_2$-A, and —$CH(CH_3)$-A, where A is phenyl or cyclohexyl, wherein Y is a divalent hydrocarbon radical comprising a linear or branched alkylene radical having from about 2 to 8 carbon atoms; wherein n is an integer of from 1 to 100; and wherein $R^6$ is a second polymerizable moiety selected from the group consisting of (meth)acrylate, allyl, vinyl, maleate, itaconate and fumarate;

b) water;
c) at least one emulsifier; and
d) from 0 to 4 pphm of ionic monomer,
subject to the proviso that if a polymerizable polyethylene glycol monomer corresponding to structural formula (II) is not employed in the polymer the latex binder comprises an emulsifier corresponding to structural formula (III):

$$Ph-(OZ)_m-R^{10} \qquad (III)$$

wherein Ph is a phenyl group substituted at the 2, 4 and 6 positions with groups $R^7$, $R^8$ and $R^9$ respectively, with $R^7$, $R^8$ and $R^9$ being independently selected from the group consisting of butyl, tert-butyl, isobutyl, —$CH_2$-E, and —CH($CH_3$)-E, where E is phenyl or cyclohexyl; wherein Z is a divalent hydrocarbon radical comprising a linear or branched alkylene radical having from about 2 to 8 carbon atoms; wherein m is an integer of from 1 to 100; and wherein $R^{10}$ is selected from the group consisting of —OH, —$OCH_3$, —$OC_2H_5$, —$OC_3H_7$, —$OC_4H_9$, —$OC_5H_{11}$, —$OC_6H_{13}$, —Cl, —Br, —CN, phosphonate (—$PO_3^-M^+$), phosphate ($PO_4^-M^+$), sulfate ($SO_4^-M^+$), sulfonate ($SO_3^-M^+$), carboxylate ($CO_2^-M^+$), and a quaternary ammonium ion, wherein $M^+$ is a cation,
   wherein the total by weight of polymerizable polyalkylene glycol monomer of structural formula (I), polymerizable polyalkylene glycol monomer of structural formula (II), and emulsifier of structural formula (III) is from about 1 to about 8 pphm.

2. The latex binder of claim 1 wherein the number average molecular weight of the polyalkylene glycol moiety in the polymerizable polyalkylene glycol monomer of structural formula (I) is from about 200 to about 1000.

3. The latex binder of claim 1 wherein X is ethylene and $R^2$ is H.

4. The latex binder of claim 1, wherein the polymerizable polyalkylene glycol monomer of structural formula (I) is utilized in an amount of at least about 1 pphm.

5. The latex binder of claim 1, wherein emulsifier in accordance with structural formula (III) is present in an amount of at least about 1 pphm.

6. The latex binder of claim 1, wherein the acrylic monomer is selected from the group consisting of $C_1$-$C_{10}$ alkyl esters of α,β-ethylenically unsaturated $C_2$-$C_6$ monocarboxylic acids, hydroxyl $C_1$-$C_{10}$ alkyl esters of α,β-ethylenically unsaturated $C_2$-$C_6$ monocarboxylic acids, $C_1$-$C_{10}$ alkyl diesters of α,β-ethylenically unsaturated $C_4$-$C_8$ dicarboxylic acids, and mixtures thereof.

7. The latex binder of claim 1 wherein at least one polymerizable polyalkylene glycol monomer of structural formula (I) and at least one polymerizable polyalkylene glycol monomer of structural formula (II) are employed in a weight ratio of from about 1:4 to about 4:1 structural formula (I):structural formula (II).

8. The latex binder of claim 1 wherein at least one polymerizable polyalkylene glycol monomer of structural formula (I) and at least one emulsifier of structural formula (III) are employed in a weight ratio of from about 1:4 to about 4:1 structural formula (I):structural formula (III).

9. A coating composition comprising a pigment and a latex binder in accordance with claim 1.

10. A latex binder useful in preparing a zero or low VOC latex coating composition, the latex binder comprising:
   a) a polymer which is a polymerization product of at least:
      i) at least one polymerizable polyalkylene glycol monomer corresponding to structural formula (I):

$$R^1-(XO)_x-R^2 \qquad (I)$$

wherein $R^1$ is a first polymerizable moiety selected from the group consisting of (meth)acrylate, allyl, vinyl, maleate, itaconate and fumarate, X is a $C_2$-$C_3$ divalent alkylene group, x is from 4 to 25, and $R^2$ is H or $CH_3$;
      ii) at least one acrylic monomer which is copolymerizable with the polymerizable polyethylene glycol monomer;
   b) water;
   c) an emulsifier corresponding to structural formula (III):

$$Ph-(OZ)_m-R^{10} \qquad (III)$$

wherein Ph is a phenyl group substituted at the 2, 4 and 6 positions with groups $R^7$, $R^8$ and $R^9$ respectively, with $R^7$, $R^8$ and $R^9$ being independently selected from the group consisting of butyl, tert-butyl, isobutyl, —$CH_2$-E, and —CH($CH_3$)-E, where E is phenyl or cyciohexyl; wherein Z is a divalent hydrocarbon radical comprising a linear or branched alkylene radical having from about 2 to 8 carbon atoms; wherein m is an integer of from 1 to 100; and wherein $R^{10}$ is selected from the group consisting of —OH, —$OCH_3$, —$OC_2H_5$, —$OC_3H_7$, —$OC_4H_9$, —$OC_5H_{11}$, —$OC_6H_{13}$, —Cl, —Br, —CN, phosphonate (—$PO_3^-M^+$), phosphate ($PO_4^-M^+$), sulfate ($SO_4^-M^+$), sulfonate ($SO_3^-M^+$), carboxylate ($CO_2^-M^-$), and a quaternary ammonium ion, wherein $M^+$ is a cation; and
   d) from 0 to 4 pphm of ionic monomer,
      wherein the total by weight of polymerizable polyalkylene glycol monomer of structural formula (I) and emulsifer of structural formula (III) is from about 1 to about 8 pphm.

11. The latex binder of claim 10 wherein the number average molecular weight of the polyalkylene glycol moiety in the polymerizable polyalkylene glycol monomer of structural formula (I) is from about 200 to about 1000.

12. The latex binder of claim 10 wherein X is ethylene and $R^2$ is H.

13. The latex binder of claim 10, wherein polymerizable polyalkylene glycol monomer of structural formula (I) is utilized in an amount of at least about 1 pphm.

14. The latex binder of claim 10, wherein emulsifier in accordance with structural formula (III) is present in an amount of at least about 1 pphm.

15. The latex binder of claim 10, wherein the acrylic monomer includes one or more monomers selected from the group consisting of $C_1$-$C_{10}$ alkyl esters of acrylic acid and methacrylic acid.

16. The latex binder of claim 10 wherein at least one polymerizable polyaikylene glycol monomer of structural formula (I) and at least one emulsifier of structural formula (III) are employed in a weight ratio of from about 1:4 to about 4:1 structural formula (I):structural formula (III).

17. A coating composition comprising a pigment and a latex binder in accordance with claim 10.

18. A latex binder useful in preparing a zero or low VOC latex coating composition, the latex binder comprising:
   a) a polymer which is a polymerization product of at least:
      i) about 0.5 to about 6 pphm of polyethylene glycol methacrylate;
      ii) at least one acrylic monomer which is copolymerizable with the polyethylene glycol methacrylate, including one or more monomers selected from the group consisting of $C_1$-$C_{10}$ alkyl esters of acrylic acid and methacrylic acid;
   b) water; and
   c) about 0.5 to about 6 pphm of tristyrylphenol ethoxylate emulsifier;

wherein polyethylene glycol methacrylate and tristyrylphenol ethoxylate are employed in a weight ratio of from about 1:4 to about 4:1 polyethylene glycol methacrylate:tristyryiphenol ethoxylate.

19. A method of making a latex binder useful for preparing a low or zero VOC coating composition, wherein the method comprises:

a) forming an aqueous emulsion comprised of:

i) at least one polymerizable polyalkylene glycol monomer corresponding to structural formula (I):

$$R^1\text{---}(XO)_x\text{---}R^2 \qquad (I)$$

wherein $R^1$ is a first polymerizable moiety selected from the group consisting of (meth)acrylate, allyl, vinyl, maleate, itaconate and fumarate, X is a $C_2$-$C_3$ divalent alkylene group, x is from 4 to 25, and $R^2$ is H or $CH_3$;

$$PH\text{---}(OY)_n\text{---}R^6 \qquad (II)$$

wherein Ph is a phenyl group substituted at the 2, 4 and 6 positions with groups $R^3$, $R^4$ and $R^5$ respectively, with $R^3$, $R^4$ and $R^5$ being independently selected from the group consisting of butyl, tert-butyl, isobutyl, —$CH_2$-A, and —$CH(CH_3)$-A, where A is phenyl or cyclohexyl, wherein Y is a divalent hydrocarbon radical comprising a linear or branched alkylene radical having from about 2 to 8 carbon atoms; wherein n is an integer of from 1 to 100; and wherein $R^6$ is a second polymerizable moiety selected from the group consisting of (meth)acrylate, allyl, vinyl, maleate, itaconate and fumarate;

ii) at least one acrylic monomer which is copolymerizable with the polymerizable polyalkylene glycol monomer of structural formula (I);

iii) optionally, at least one polymerizable polyalkylene glycol monomer corresponding to structural formula (II):

$$PH\text{---}(OY)_n\text{---}R^6 \qquad (II)$$

wherein Ph is a phenyl group substituted at the 2, 4 and 6 positions with groups $R^3$, $R^4$ and $R^5$ respectively, with $R^3$, $R^4$ and $R^5$ being independently selected from the group consisting of butyl, tert-butyl, isobutyl, —$CH_2$-A, and —$CH(CH_3)$-A, where A is phenyl or cyclohexyl, wherein Y is a divalent hydrocarbon radical comprising a linear or branched alkylene radical having from about 2 to 8 carbon atoms; wherein n is an integer of from 1 to 100; wherein $R^6$ is a second polymerizable moiety selected from the group consisting of (meth)acrylate, allyl, vinyl, maleate, itaconate and fumarate;

iv) water;

v) at least one emulsifier; and vi) from 0 to 4 pphm of ionic monomer, subject to the proviso that if a polymerizable polyethylene glycol monomer corresponding to structural formula (II) is not present the aqueous emulsion comprises an emulsifier corresponding to structural formula (III):

$$PH\text{---}(OZ)_m\text{---}R^{10} \qquad (III)$$

wherein Ph is a phenyl group substituted at the 2, 4 and 6 positions with groups $R^7$, $R^8$ and $R^9$ respectively, with $R^7$, $R^8$ and $R^9$ being independently selected from the group consisting of butyl, tert-butyl, isobutyl, —$CH_2$-E, and —$CH(CH_3)$-E, where E is phenyl or cyclohexyl, wherein Z is a divalent hydrocarbon radical comprising a linear or branched alkylene radical having from about 2 to 8 carbon atoms; wherein m is an integer of from 1 to 100; wherein $R^{10}$ is selected from the group consisting of —OH, —$OCH_3$, —$OC_2H_5$, —$OC_3H_7$, —$OC_4H_9$, —$OC_5H_{11}$, —$OC_6H_{13}$, —Cl, —Br, —CN, phosphonate (—$PO_3^-M^+$), phosphate ($PO_4^-M^+$), sulfate ($SO_4^-M^+$), sulfonate ($SO_3^-M^+$), carboxylate ($CO_2^-M^+$), and a quaternary ammonium ion, wherein $M^+$ is a cation;

b) initiating polymerization of the polymerizable polyalkylene glycol monomer of structural formula (I), the polymerizable polyalkylene glycol monomer of structural formula (II), if present, and the acrylic monomer; and c) forming a polymer, in latex form, comprising polymerized units of the polymerizable polyalkylene glycol monomer of structural formula (I), the polymerizable polyalkylene glycol monomer of structural formula (II), if present, and the acrylic monomer.

* * * * *